(12) United States Patent
Hayman et al.

(10) Patent No.: US 6,668,546 B2
(45) Date of Patent: Dec. 30, 2003

(54) UTILIZATION OF AIR-ASSISTED DIRECT INJECTION, CYLINDER DEACTIVATION AND CAMSHAFT PHASING FOR IMPROVED CATALYTIC CONVERTER LIGHT-OFF IN INTERNAL COMBUSTION ENGINES

(75) Inventors: Alan William Hayman, Romeo, MI (US); Gary J. Patterson, Utica, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/078,280

(22) Filed: Feb. 19, 2002

(65) Prior Publication Data

US 2003/0154711 A1 Aug. 21, 2003

(51) Int. Cl.[7] .................................................. F01N 3/00
(52) U.S. Cl. ........................... 60/284; 60/285; 60/286; 60/274; 123/533; 123/481; 123/198 F
(58) Field of Search ....................... 60/274, 284, 285, 60/286, 293; 123/533, 481, 198 F

(56) References Cited

U.S. PATENT DOCUMENTS

| | | | | |
|---|---|---|---|---|
| 5,495,839 A | * | 3/1996 | Samejima et al. | 123/478 |
| 5,701,866 A | * | 12/1997 | Sagisaka et al. | 123/339.15 |
| 5,722,363 A | * | 3/1998 | Iida et al. | 123/305 |
| 5,950,419 A | * | 9/1999 | Nishimura et al. | 60/274 |
| 5,992,143 A | * | 11/1999 | Manaka et al. | 60/284 |
| 6,023,929 A | * | 2/2000 | Ma | 60/295 |
| 6,209,526 B1 | | 4/2001 | Sun et al. | 123/481 |
| 6,244,242 B1 | | 6/2001 | Grizzle et al. | 123/295 |
| 6,336,071 B2 | | 1/2002 | Grizzle et al. | 701/115 |
| 6,389,806 B1 | * | 5/2002 | Glugla et al. | 60/284 |
| 6,408,618 B2 | * | 6/2002 | Ide | 60/285 |

* cited by examiner

Primary Examiner—Thomas Denion
Assistant Examiner—Binh Tran
(74) Attorney, Agent, or Firm—Christopher DeVries

(57) ABSTRACT

A vehicle engine control system controls an engine that includes a plurality of cylinders and that generates exhaust gas. An air-assisted direct injection fuel system supplies an air/fuel mixture to the cylinders. A catalytic converter reduces harmful emissions from the exhaust gas after the catalytic converter reaches a light-off temperature. A controller communicates with the engine, the catalytic converter and the air-assisted direct injection fuel system. The controller optimizes cam phasing, the air/fuel mixture and spark angle for full and partial engine operating modes. The controller deactivates at least one of the cylinders of the engine before the catalytic converter achieves the light-off temperature to hasten light-off of the catalytic converter.

41 Claims, 8 Drawing Sheets

UTILIZATION OF AIR-ASSISTED DIRECT INJECTION, CYLINDER DEACTIVATION AND CAMSHAFT PHASING FOR IMPROVED CATALYTIC CONVERTER LIGHT-OFF IN INTERNAL COMBUSTION ENGINES

TECHNICAL FIELD

The present invention relates to engine control systems, and more particularly to engine control systems for internal combustion engines with a catalytic converter.

BACKGROUND OF THE INVENTION

In order to reduce emissions, modern car engines carefully control the amount of fuel that is burned. The engines control the air-fuel mixture to achieve an optimum stoichiometric ratio. At the optimum stoichiometric ratio, all of the fuel is burned using all of the oxygen in the air. For internal combustion engines, the stoichiometric ratio is about 14.7:1. In other words, for each pound of gasoline, 14.7 pounds of air is burned. The air-fuel mixture varies from the optimum stoichiometric ratio during driving. Sometimes the air-fuel mixture is lean (an air-to-fuel mixture higher than 14.7), and other times the air-fuel mixture is rich (an air-to-fuel mixture lower than 14.7).

The primary emissions of a car engine are nitrogen, carbon dioxide and water vapor. Air is approximately 78 percent nitrogen ($N_2$) gas. Most of the nitrogen passes through the car engine. Carbon dioxide ($CO_2$) is produced when carbon in the fuel bonds with the oxygen in the air. Water vapor ($H_2O$) is produced when hydrogen in the fuel bonds with the oxygen in the air.

Because the combustion process is never perfect, some additional harmful emissions are also produced by car engines. Carbon monoxide (CO), a poisonous gas that is colorless and odorless, is produced. Hydrocarbons or volatile organic compounds (VOCs), resulting from unburned fuel that evaporates, are produced. Sunlight breaks these emissions down to form oxidants that react with oxides of nitrogen to cause ground level ozone ($O_3$), a major component of smog. Oxides of nitrogen (NO and $NO_2$, together called NOx) contribute to smog and acid rain and cause irritation to human mucus membranes. Catalytic converters are designed to reduce these three harmful emissions.

Most modern cars are equipped with three-way catalytic converters. "Three-way" refers to the three harmful emissions that catalytic converters help to reduce—carbon monoxide, VOCs and NOx. The catalytic converter uses two different types of catalysts, a reduction catalyst and an oxidization catalyst. Both types include a ceramic structure that is coated with a metal catalyst, usually platinum, rhodium and/or palladium. The catalytic converter exposes the catalyst to the exhaust stream while minimizing the amount of catalyst that is required due to the high cost of the catalyst materials.

There are two main types of structures that are used in catalytic converters—honeycomb and ceramic beads. Most cars today use a honeycomb structure. The reduction catalyst is the first stage of the catalytic converter that typically uses platinum and rhodium to help reduce the NOx emissions. When the NOx molecules contact the catalyst, the catalyst separates the nitrogen from the molecule, holds on to the nitrogen and frees the oxygen in the form of $O_2$. The nitrogen bonds with other nitrogen that are also held by the catalyst, forming $N_2$:

$$2NO => N_2 + O_2 \text{ or } 2NO_2 => N_2 + 2O_2$$

The oxidation catalyst is the second stage of the catalytic converter that reduces the unburned hydrocarbons and carbon monoxide by burning (oxidizing) them over a platinum and palladium catalyst. The oxidation catalyst reacts the CO and hydrocarbons with the remaining oxygen in the exhaust gas:

$$2CO + O_2 => 2CO_2$$

The third stage is a control system that monitors the exhaust stream and uses the information to control the fuel injection system. Typically, an oxygen sensor is mounted between the engine and the catalytic converter. The oxygen sensor senses oxygen in the exhaust. An engine control system increases or decreases the amount of oxygen in the exhaust by adjusting the air-fuel mixture. The engine control system operates the engine at close to the optimum stoichiometric ratio. The engine control system provides enough oxygen in the exhaust to allow the oxidization catalyst to burn the unburned hydrocarbons and CO.

While the catalytic converter reduces pollution, the catalytic converter can still be improved substantially. The catalytic converter must be heated to a fairly high temperature before operating. When a car is started, the catalytic converter does not reduce the pollution in the exhaust until the catalytic converter reaches a predetermined temperature that is also called the light-off temperature.

One conventional solution to the delay is to move the catalytic converter closer to the engine. The hot exhaust gases reach the catalytic converter more quickly and heats the catalytic converter faster. This approach tends to reduce the life of the catalytic converter by exposing the catalytic converter to extremely high temperatures. Most carmakers position the catalytic converter under the front passenger seat, far enough from the engine to keep the temperature down to levels that will not harm it.

Preheating the catalytic converter is another conventional way to reduce emissions. The easiest way to preheat the converter is to use electric resistance heaters. Unfortunately, the 12-volt electrical systems on most cars do not provide enough energy to heat the catalytic converter fast enough. Most drivers will not wait several minutes for the catalytic converter to heat up before starting their car.

SUMMARY OF THE INVENTION

A vehicle engine control system and method according to the present invention controls an engine that includes a plurality of cylinders and that generates exhaust gas. An air-assisted direct injection fuel system supplies an air/fuel mixture to the cylinders. A catalytic converter reduces harmful emissions from the exhaust gas after the catalytic converter reaches a light-off temperature. A controller communicates with the engine and the air-assisted direct injection fuel system. The controller deactivates at least one of the cylinders of the engine before the catalytic converter achieves the light-off temperature to hasten light-off of the catalytic converter.

In another feature of the invention, a vehicle engine control system and method controls an engine that includes a plurality of cylinders and that generates exhaust gas. An air-assisted direct injection fuel system supplies an air/fuel mixture to the cylinders. A catalytic converter that reduces hydrocarbon emissions from the exhaust gas after the catalytic converter reaches a light-off temperature. A controller modifies cam phasing, varies the average air/fuel mixture, and retards spark angle to hasten catalytic converter light-off.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENT

The following description of the preferred embodiment(s) is merely exemplary in nature and is in no way intended to limit the invention, its application, or uses.

Figure 1:
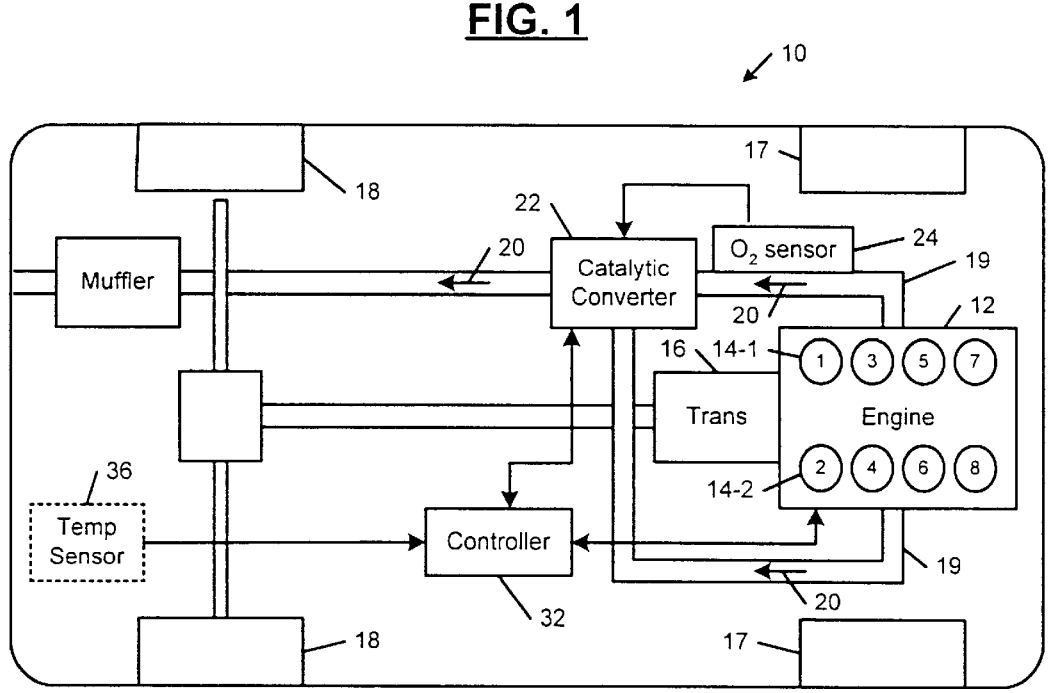
FIG. 1 is a functional block diagram illustrating a vehicle with an engine, a catalytic converter and a controller that deactivates one or more cylinders of the engine to promote early light-off of the catalytic converter.

Referring now to FIG. 1, a vehicle 10 includes an engine 12 with a plurality of cylinders 14-1, 14-2, . . . , 14-n. The engine 12 is connected to a transmission 16 that drives front wheels 17 and/or rear wheels 18 of the vehicle 10. The engine 12 is also connected to an exhaust manifold 19. The exhaust manifold 19 directs exhaust gas 20 from the engine 12 to a catalytic converter 22. An oxygen sensor 24 is typically located between the engine 12 and the catalytic converter 22. As can be appreciated, the oxygen sensor 24 can be located in other positions and/or omitted. A muffler 28 is also located downstream from the catalytic converter 22.

A controller 32 is connected to the catalytic converter 22, the engine 12, and one or more engine operating sensors and/or environmental sensors, such as an ambient temperature sensor 36. As will be described more fully below, the controller 32 deactivates one or more of the cylinders 14 of the engine 12 during idle or low load conditions as soon as possible after the engine 12 starts up.

Cylinder deactivation methods are disclosed in U.S. Pat. No. 4,249,488 to Siegla and U.S. Pat. No. 4,230,076 to Mueller, which are hereby incorporated by reference. Other methods are disclosed in "Cadillac Sedan DeVille, Hold on for dear life with the world's first variable-displacement engine," *Car and Driver* (April 1981); "New Mercedes revives V-8 cylinder deactivation," Peter Robinson, *Ward's Engine and Vehicle Technology Update* (Oct. 1, 1998); and "Reduced Fuel Consumption and Emissions Through Cylinder Deactivation," Malcolm H. Sanford, Jeffrey Allen, Roger Tudor, Dr. Gerhard Maas and Michael Maas (Oct. 7, 1998), which are hereby incorporated by reference.

The working cylinders 14 are at a higher load with faster flame heads and more stable combustion (as compared to when all cylinders are operating). The controller 32 adjusts cam phasing, the air/fuel mixtures and spark angle for increased exhaust gas temperatures and quicker light-off of the catalytic converter 22. The idle speed of the engine 12 is also optimized as necessary during the warm-up period of the catalytic converter 22.

Once light-off of the catalytic converter 22 is achieved, the engine 12 is switched back to default operation, which may or may not include operation using all of the cylinders 14 depending upon other factors. At very cold temperatures (such as −40° C. to 20° C.), full operation of the engine 12 (e.g., all cylinders) is typically performed.

Cylinder deactivation involves turning off one or more of the cylinders of the engine 12 during idle and light load operating conditions. Full engine operation is automatically restored when necessary for acceleration or for hauling heavy loads. During idle and light load operating conditions, the (fewer) working cylinders operate at higher load. During idle and light load operating conditions, the engine 12 has higher combustion stability and fuel efficiency due to better thermal, volumetric, and mechanical efficiency.

Figure 2:
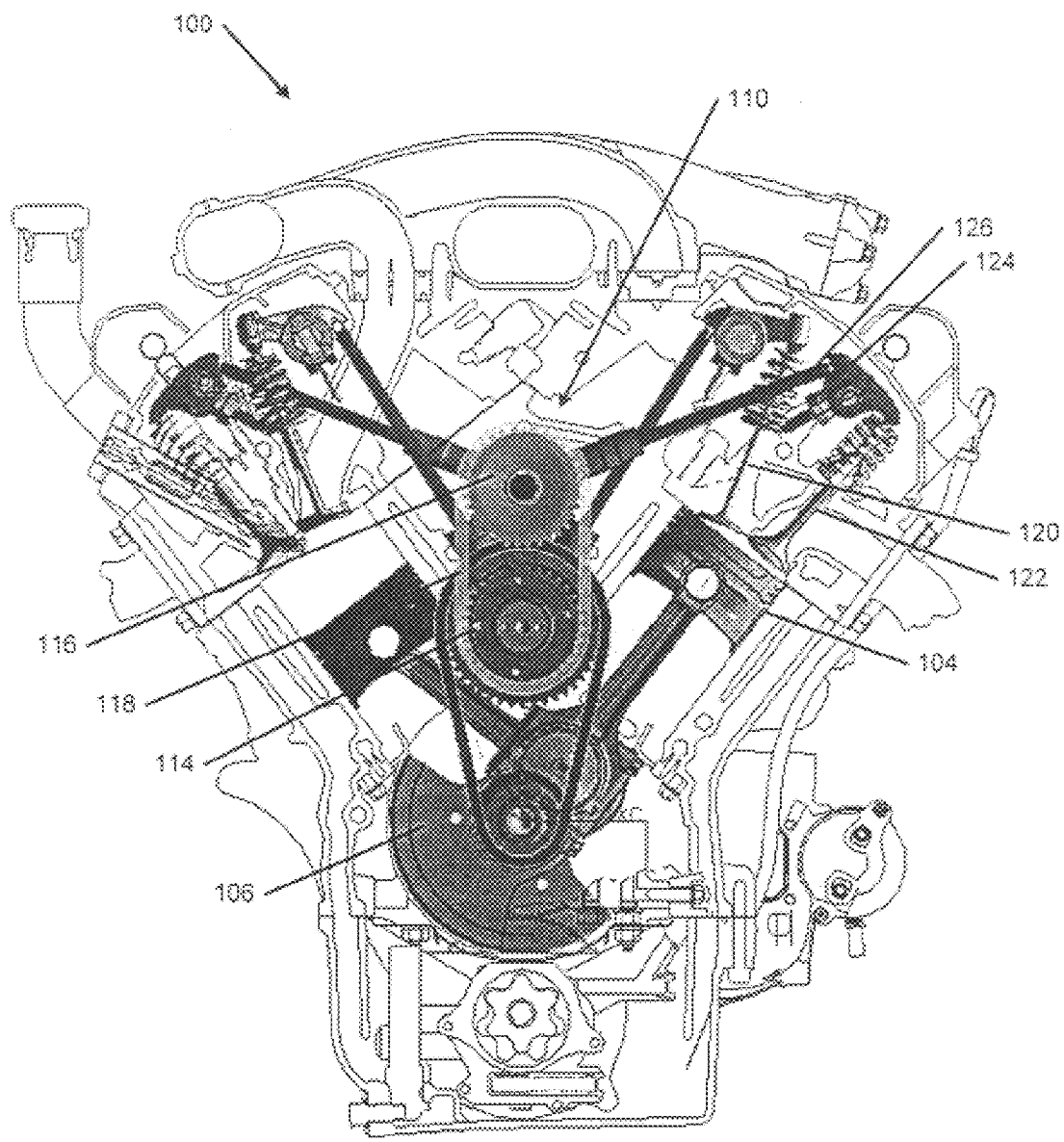
FIG. 2 is a cross-sectional view of an exemplary air-assisted direct injection (AADI) internal combustion engine (ICE)
Figure 3:
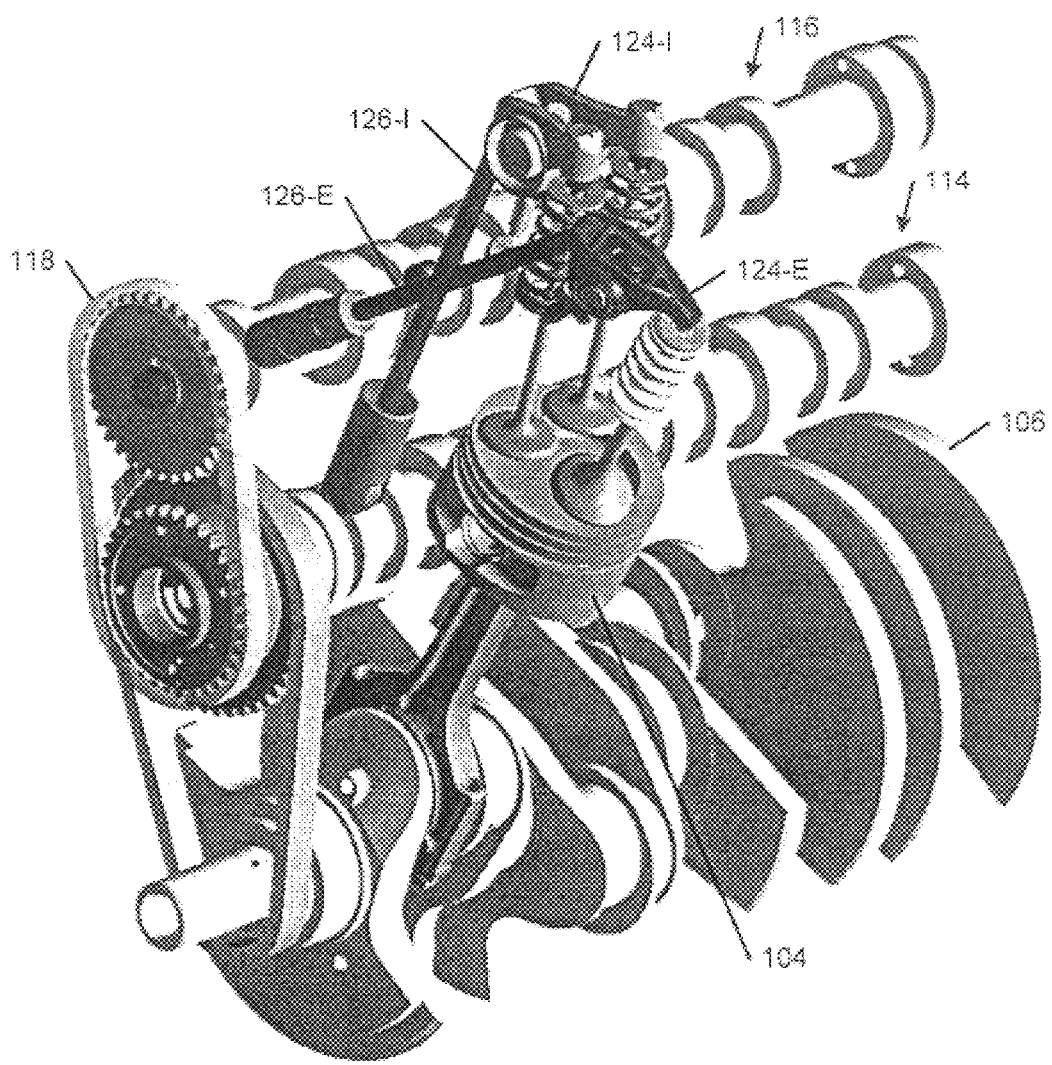
FIG. 3 is a perspective view of some of the rotating components of the AADI ICE of FIG. 2.

Referring now to FIGS. 2 and 3, an air-assisted direct injection (AADI) internal combustion engine (ICE) 100 that employs cylinder deactivation is illustrated. While the present invention will be described in conjunction with a specific AADI ICE, other configurations of the AADI ICE are contemplated. The exemplary AADI ICE 100 includes pistons 104, a crankshaft 106 and a camshaft drive 110. The camshaft drive 110 includes an intake camshaft 114 and an exhaust camshaft 116 that are rotated via one or more belts 118 that are driven by the crankshaft 106.

The camshafts 114 and 116 have cam lobe profiles that provide a prescribed dynamic motion and timing of engine intake and exhaust valves 120 and 122. The intake valves 120 and exhaust valves 122 are actuated by hydraulic lifters (cam followers) 124 and pushrods 126. A cam phaser (not shown) that is attached to the intake camshaft 114 allows the timing of intake valves to be varied independently of the crankshaft 106 and the exhaust camshaft 116 timing.

The camshafts 114 and 116 are located in a vertical plane above the crankshaft 106 and parallel to a center of rotation of the crankshaft 106. The intake camshaft 114 is below the exhaust camshaft 116 and is located approximately in the center of the engine block. Intake cam phasing allows improved control over the torque characteristics of the AADI ICE 100 at full load. In a preferred embodiment, a hydraulically actuated vane type cam phaser is employed. The timing of an intake valve event can be continuously varied up to 60 degrees in order to optimize volumetric efficiency and fuel economy of the AADI ICE 100.

Figure 4:
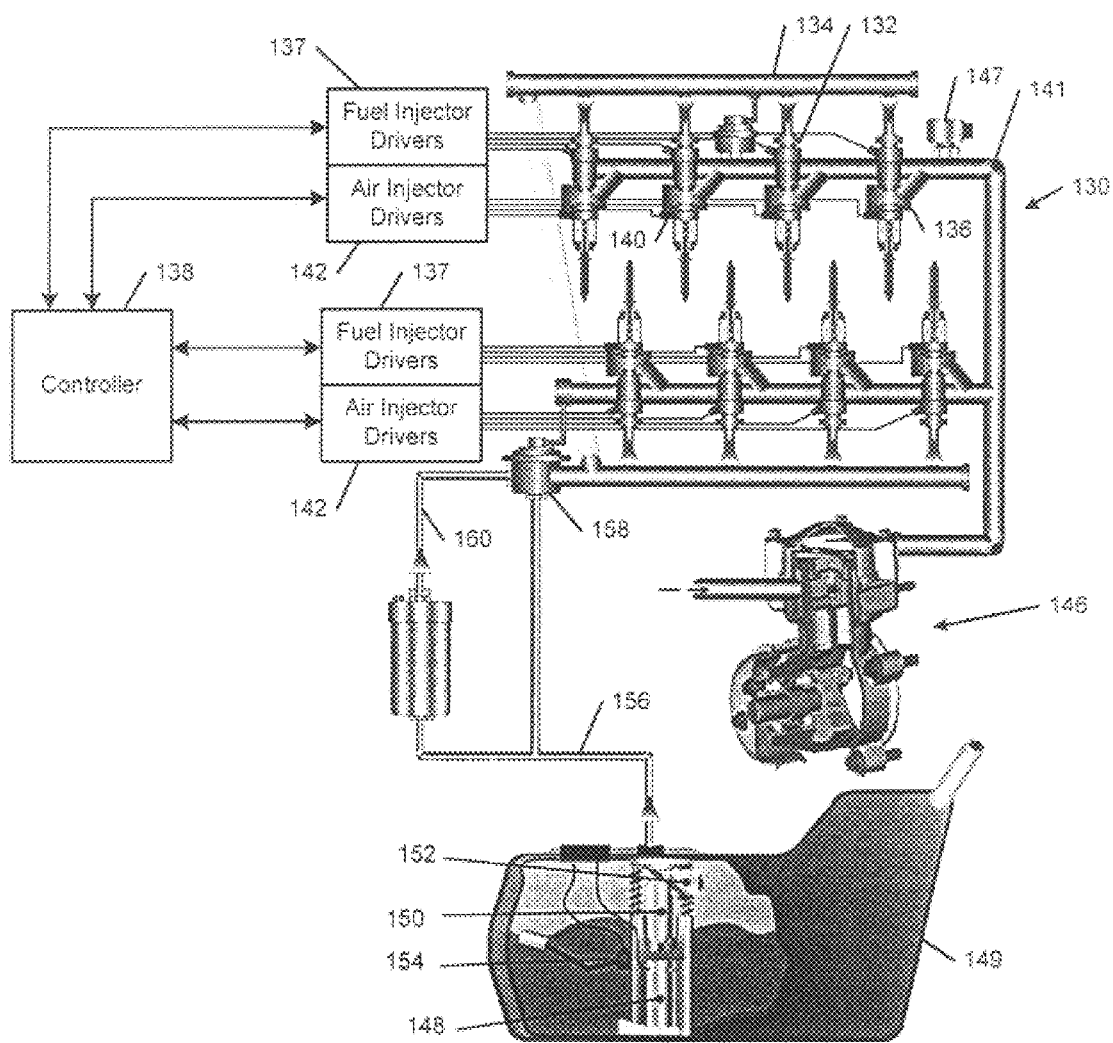
FIG. 4 is a partial functional block diagram and partial illustration of fuel and air delivery for the AADI ICE of FIG. 2.
Figure 5:
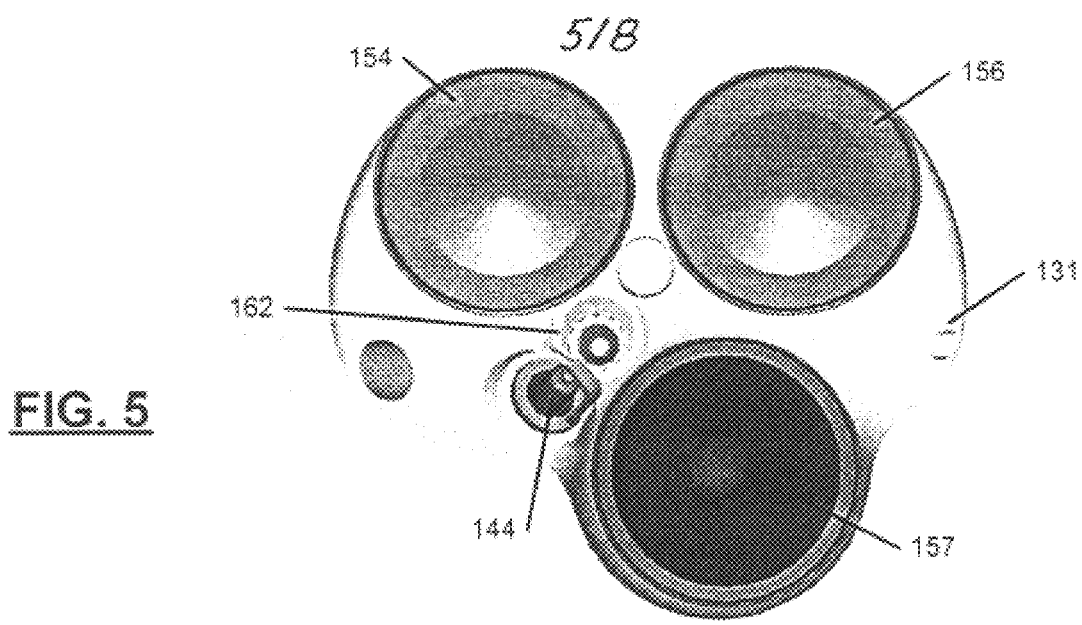
FIG. 5 illustrates a cylinder head including two intake valves and one exhaust valve, a fuel injector, and a spark plug.

Referring now to FIGS. 4 and 5, an air/fuel system 130 for the AADI ICE 100 is shown in further detail. The air/fuel system 130 is integrated with cylinder heads 131. Preferably, the cylinder heads 131 have three valves. Fuel injectors 132 meter fuel from a fuel rail 134 into an injection chambers 136. The fuel injectors 132 communicate with fuel injector drivers 137 that communicate with a controller 138 Air injectors 140 provide a sonic air blast from an air rail 141 that atomizes the fuel and delivers the fuel to the combustion chambers. The air injectors 140 communicate with air injection drivers 142 that are controlled by the controller 138.

An integrated spark plug/coil 144 is packaged in the cylinder head 131 in an optimal position with respect to the intake valves 120 for improved spray-jet combustion. In a preferred embodiment, the spark plug/coil 144 is located adjacent to the intake valves 120 as shown in FIG. 5. A compressed air feed to the air injectors 140 is integrated into the cylinder head 131 to simplify plumbing, connections and packaging. An air compressor 146 feeds air to the air rail 141, into the cylinder head 131 and then into the air injectors 140. The air compressor 146 is preferably belt- or chain-driven. The air compressor 146 preferably provides approximately 650 kPa air system pressure. An air pressure sensor 147 senses air pressure in the air rail 141 and is connected to the controller 138 and/or the air compressor 146.

The cylinder head 131 is a three-valve-per-cylinder combustion system design that includes two intake valves 154 and 156 and one exhaust valve 157. The intake valve lifter 124-I is forked to allow one camshaft lobe to open both valves. Lash adjusters (not shown) are located in the rocker tips to independently adapt to each valve. The intake and exhaust camshafts 114 and 116 enable dual independent camshaft phasing and optimized valve train geometry for rigidity. The dynamic bank-to-bank valve timing variations are subsequently much lower than with four-cam V8s because the initial timing variation and cam phasing control dithering affects both banks equally. The pushrods 126 are preferably relatively short and stiff. The roller cam follower for the intake valve lifter 124-I is larger in diameter to improve durability due to an increased load caused by the operation of two valves.

A fuel pump 148 pumps fuel from a fuel tank 149 through a filter 150 and a low pressure regulator 152. A fuel tank level sender 153 provides a tank level signal. A low pressure fuel line 156, typically operating at 400 kPa, connects a fuel output of the low pressure regulator 152 to a pressure regulator 158 and a higher pressure fuel line 160, typically operating at 800 kPa.

The intake lifters for select cylinders or all the cylinders can be switched off to keep the valves for those cylinders closed. The control system automatically adjusts the amount of fuel injected into the remaining cylinders to precisely maintain torque while the deactivated cylinders efficiently compress and expand the trapped combustion products. This can reduce fuel consumption by 15–20 percent under light load operating conditions.

Figure 6:
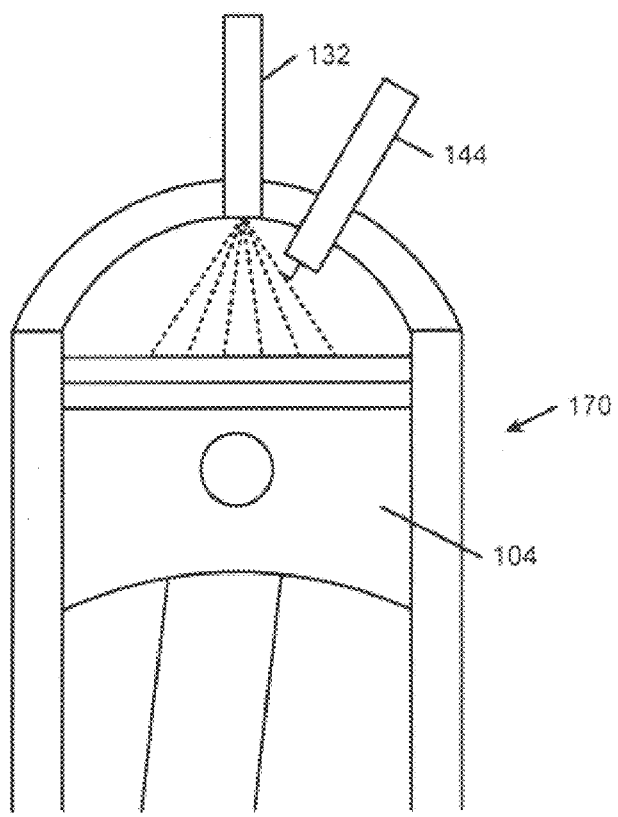
FIG. 6 illustrates an air/fuel cone that is optimally stratified and shaped by the fuel injector of FIG. 5.

Referring now to FIG. 6, a cylinder 170 of the AADI ICE 100 is shown. The fuel injector 132 employs AADI to provide a highly stratified and precisely shaped cone 172 of fuel and air having a highly defined shape. The fuel injector 132 provides a lean air/fuel mixture (in other words, greater than 14.7:1) on average while providing a rich air/fuel mixture (in other words, less than 14.7:1) inside of the cone 172. In a highly preferred embodiment, the average air/fuel ratio is approximately 16:1. However, the air/fuel ratio inside of the cone 172 is 10:1 to 12:1. Outside of the cone 172, the air/fuel ratio is typically greater than 160:1 and often approaches pure air. Because the cone 172 is in direct contact with the spark plug 144, the air/fuel ratio of the cone 172 is rich and the fuel is highly stratified, the air/fuel mixture ignites and is fully burned.

Figure 7:
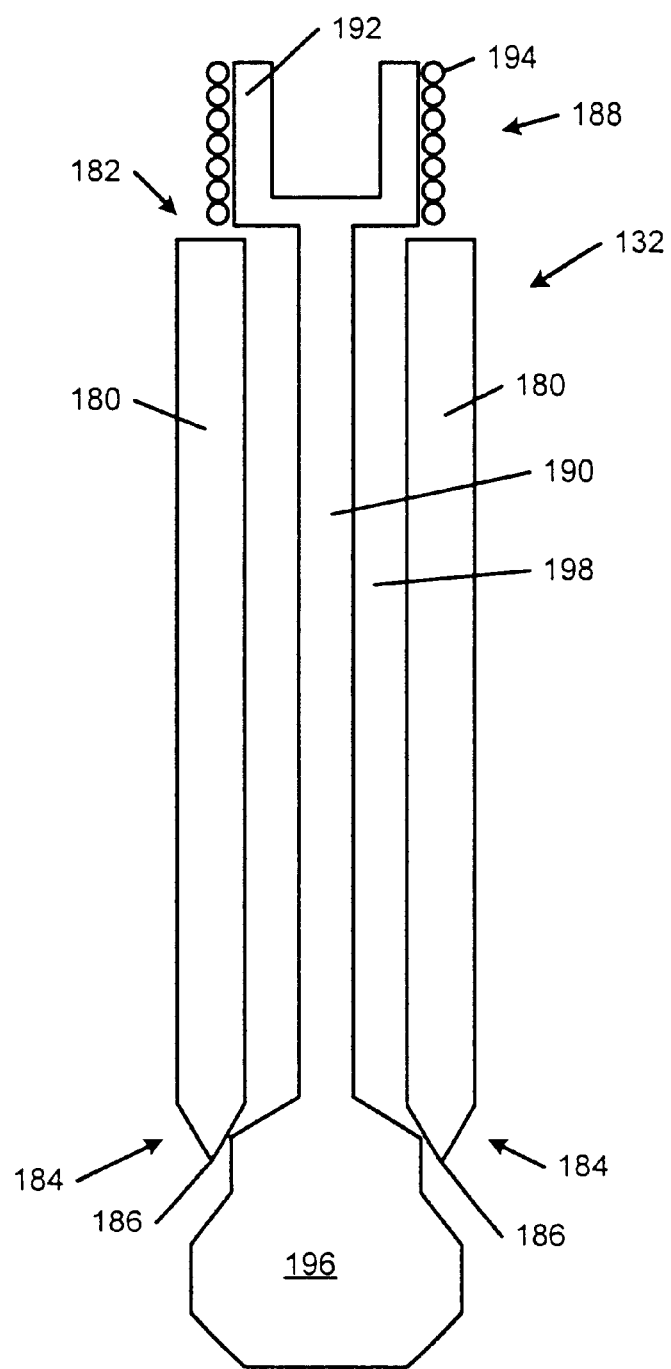
FIG. 7 illustrates the fuel injector of FIG. 5 in further detail.

Referring now to FIG. 7, a simplified view of the fuel injector 132 is shown. The fuel injector 132 includes a sleeve 180 having one end that provides a stop surface 182 and an opposite end 184 that provides a sharp edge 186. A solenoid 188 moves a shaft 190 between first and second positions. For example, one end of the shaft 190 may include a ferrous cup 192 that is wound with conductors 194. A pintle 196 is formed on an opposite end of the shaft 190. When the fuel injector driver 137 supplies current to the conductors 194, the shaft 190 moves downwardly against the stop surface 182. A gap having predetermined dimensions is formed between the end 184 and the pintle 196. Pressurized fuel 198 that is located between the shaft 190 and the sleeve 180 is blown past sharp edges at sonic velocities to create the cone 172.

Figure 8:
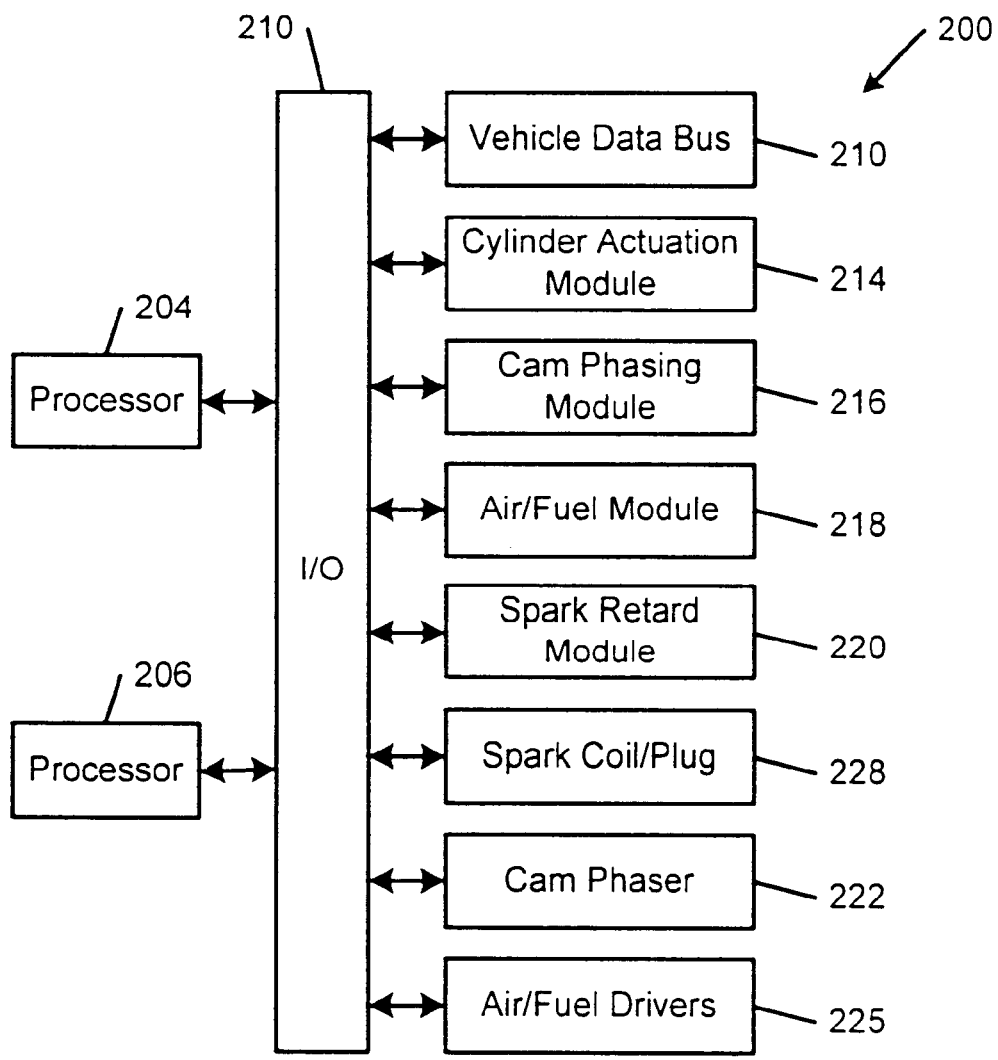
FIG. 8 is a functional block diagram of a controller for the AADI ICE of FIG. 2.

Referring now to FIG. 8, a controller 200 for the AADI ICE 100 is illustrated in further detail. The controller 200 includes a processor 204, memory 206, and an input/output interface 210. The controller 200 receives engine operational inputs from a vehicle data bus 212. A cylinder actuation control module 214 controls activation and deactivation of the cylinders of the AADI ICE 100. A cam phasing module 216 controls cam phasing of the AADI ICE 100. An air/fuel module 218 controls the air/fuel ratio supplied to the cylinders. A spark control model 220 controls spark timing of the AADI ICE 100. The I/O 210 also communicates with a cam phaser 222, air/fuel drivers 225, and spark coil/plugs 228. The modules 214–220 can be implemented as one or more software modules that are run by the processor 204, as dedicated integrated circuits, as application specific integrated circuits (ASICs) or in any other suitable manner. The memory 206 includes read-only memory (ROM), random access memory (RAM), flash memory, or other suitable electronic storage.

The present invention enleans the air/fuel mixture while providing stable combustion to provide increased exhaust gas temperature to hasten light-off of the catalytic converter. In contrast, other fuel injection systems are unable to support combustion at the lean air/fuel ratio. These fuel injection systems typically employ approaches involving rich air/fuel mixtures, which significantly reduces engine efficiency. For example, in port fuel injection, an air injection reaction is used to hasten catalytic converter light-off. In these fuel injection system, a rich air/fuel mixture is used. Excess unburned fuel enters the exhaust manifold. Air is introduced into the exhaust manifold to burn the excess unburned fuel from the rich air/fuel mixture. The ignited fuel heats the catalytic converter to the light-off temperature. Once the light-off temperature is reached, the fuel in air/fuel mixture is reduced.

The cam phasing module 216 generates a cam phase position signal that minimizes integrated hydrocarbon emissions and maximizes exhaust gas energy. Exhaust gas energy is a function of exhaust gas temperature and flow. The cam phasing module 216 can be implemented using mathematical functions, lookup tables or any other method. For example, the cam phasing module 216 can employ a look-up table that is accessed by one or more of the following engine parameters: barometric pressure, oil temperature, coolant temperature, and estimated catalytic converter temperature. Alternately, the cam phasing module can use a mathematical function that calculates cam phase using the same parameters or a time-based function that is based on one or more of the following parameters: coolant temperature, air temperature, and soak time.

By adjusting the cam phase, the hydrocarbons in the fuel can be drawn back into the cylinder. In other words, the cam phase is adjusted such that the exhaust valve is still open at the beginning of the intake stroke. A last portion of the exhaust in a combustion stroke typically has a higher concentration of hydrocarbons. Therefore, rebreathing these hydrocarbons using cam phasing significantly reduces hydrocarbon emissions.

The air/fuel module 218 enleans the fuel to a combustion stability limit. The combustion stability limit is a function of the air/fuel mixture and the spark angle. The combustion stability limits for an engine are typically determined through controlled testing on an engine. As the fuel becomes more lean, hydrocarbon emissions are reduced. The air/fuel module 218 can be implemented using mathematical functions, look-up tables or any other method. For example, the air/fuel module 218 can employ a look-up table that is accessed by one or more of the following engine parameters: injection air pressure, air temperature, coolant temperature, fuel pressure, rpm, and cylinder load. Cylinder load is preferably estimated using net mean pressure.

The spark control module 220 retards the spark to the combustion stability limit. The spark control module 220 can be implemented using mathematical functions, lookup tables or any other method. For example, the spark control module 220 can employ a look-up table that is accessed by one or more of the following engine parameters: injection air pressure, air temperature, coolant temperature, rpm, and cylinder load. Cylinder load is preferably estimated using net mean pressure.

Figure 9:
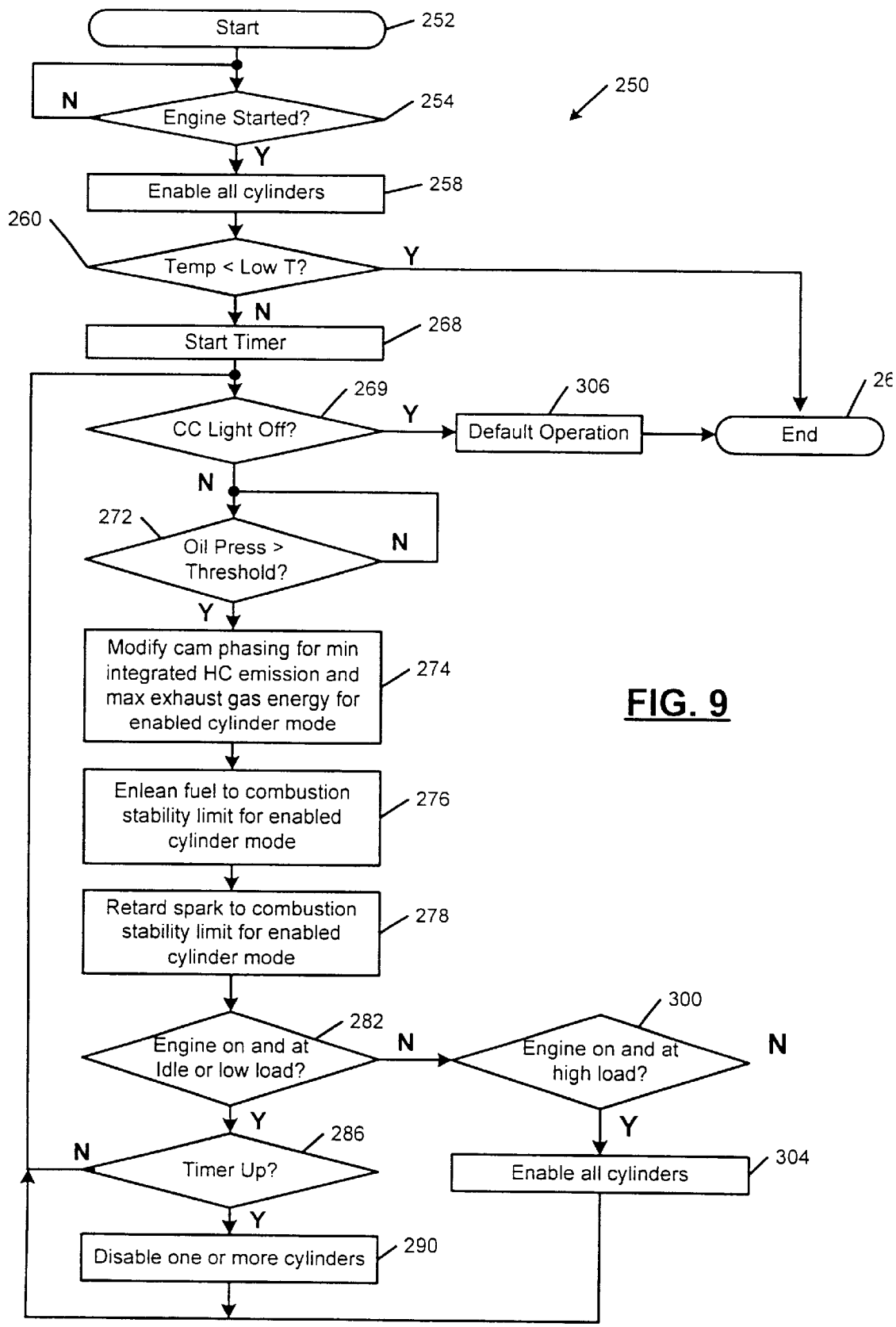
FIG. 9 is a flowchart illustrating steps performed by the controller of the engine of FIG. 8.

Referring now to FIG. 9, steps performed by the controller 200 are shown in further detail and are generally designated 250. Control begins with step 252. In step 254, the controller 200 determines whether the AADI ICE 100 is started. If not, control loops back to step 254. Otherwise, the controller 200 continues with step 258 where the full cylinder mode is initially actuated. In step 260, the controller 200 determines whether the temperature is less than a predetermined temperature such as 20° C. If it is, control ends in step 264. If not, the controller 200 continues with step 268 and starts a timer. In step 269, the controller 200 determines whether the catalytic converter is at the light-off temperature. This temperature function may be provided by temperature sensors, by onboard diagnostics such as OBD II or estimated. If the catalytic converter is not at the light-off temperature, control continues with step 272.

In step 272, the controller 200 determines whether the oil pressure is greater than a threshold. The cam phaser 222 is preferably operated by engine oil pressure. This step may be skipped if another drive mechanism for the cam phaser is employed. In step 274, cam phasing is modified for minimum integrated hydrocarbon emissions and maximum exhaust gas energy for the enabled cylinder mode, e.g., full, half or other cylinder modes such as "8/6/4". In step 276, the air/fuel ratio is adjusted to the combustion stability limit. This usually involves enleaning the fuel. In step 278, the spark angle is adjusted to the combustion stability limit. This usually involves retarding spark when operating in the half cylinder mode.

In step 282, control determines whether the AADI ICE 100 is operating at idle or low load. If it is, the controller 200 continues with step 286 and determines whether the timer is up. The timer is preferably set for a first period that is equal to five to ten seconds after the AADI ICE 100 starts up. If the timer is not up, control continues with step 269. Otherwise, control continues with step 290 where one or more of the cylinders are deactivated. Control continues from step 290 to step 269 where operation is optimized for operation on less than all of the cylinders.

If the conditions of step 282 are not met, control continues with step 300 where the controller 200 determines whether the AADI ICE 100 is at high load. If it is, the controller 200 continues with step 284 where all of the cylinders are actuated. Control continues from step 304 to step 269. When the catalytic converter 22 reaches its light-off temperature as determined in step 269, the controller 200 continues with step 306 where default operation of the AADI ICE 100 is performed, which may include activation of some or all of the cylinders 14. Control ends in step 264.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A vehicle engine control system comprising:
an engine that includes a plurality of cylinders and that generates exhaust gas;
an air-assisted direct injection fuel system that supplies an air/fuel mixture to said cylinders;
a catalytic converter that reduces hydrocarbon emissions from said exhaust gas after said catalytic converter reaches a light-off temperature;
a controller that communicates with said engine and said air-assisted direct injection fuel system and that deactivates at least one of said cylinders of said engine before said catalytic converter achieves said light-off temperature to hasten light-off of said catalytic converter, wherein said controller optimizes engine operating parameters to hasten light-off of said catalytic converter;
wherein said controller modifies cam phasing based on at least one of integrated hydrocarbon emissions and exhaust gas energy.

2. The vehicle engine control system of claim 1 wherein said controller modifies at least one of, air/fuel mixture, and spark angle.

3. The vehicle engine control system of claim 1 wherein said cam phasing is modified by a lookup table that is accessed using at least one of barometric pressure, oil temperature, coolant temperature, and estimated catalytic converter temperature.

4. The vehicle engine control system of claim 1 wherein said cam phasing is modified by at least one of barometric pressure, oil temperature, coolant temperature, and estimated catalytic converter temperature.

5. The vehicle engine control system of claim 2 wherein said controller enleans an average air/fuel mixture to reduce said hydrocarbon emissions.

6. The vehicle engine control system of claim 5 wherein said air/fuel mixture is modified by a lookup table that is accessed using at least one of injection air pressure, air temperature, coolant temperature, fuel pressure, rpm, and cylinder load.

7. The vehicle engine control system of claim 5 wherein said air/fuel mixture is modified by at least one of injection air pressure, air temperature, coolant temperature, fuel pressure, rpm, and cylinder load.

8. The vehicle engine control system of claim 5 wherein said controller adjusts said air/fuel mixture greater than 12:1.

9. The vehicle engine control system of claim 2 wherein said controller retards spark while providing stable combustion.

10. The vehicle engine control system of 2 wherein said spark angle is modified by a lookup table that is accessed using at least one of injection air pressure, air temperature, coolant temperature, rpm, and cylinder load.

11. The vehicle engine control system of claim 2 wherein said spark angle is modified by at least one of injection air pressure, air temperature, coolant temperature, rpm, and cylinder load.

12. The vehicle engine control system of claim 1 wherein said controller does not deactivate said at least one of said cylinders if an ambient temperature is below a first predetermined temperature.

13. The vehicle engine control system of claim 1 wherein said controller waits a first predetermined period after engine startup before deactivating said at least one of said cylinders.

14. The vehicle engine control system of claim 1 wherein said controller deactivates said at least one of said cylinders if said engine is operating at one of idle and low load.

15. The vehicle engine control system of claim 1 wherein said controller activates all of said cylinders if said engine is operating at high load.

16. A vehicle engine control system comprising:
an engine that includes a plurality of cylinders and that generates exhaust gas;
an air-assisted direct injection fuel system that supplies an air/fuel mixture to said cylinders;
a catalytic converter that reduces hydrocarbon emissions from said exhaust gas after said catalytic converter reaches a light-off temperature; and
a controller that communicates with said engine and said air-assisted direct injection fuel system and that modifies cam phasing to rebreathe said hydrocarbon emissions, enleans an average air/fuel mixture, and retards spark angle to hasten catalytic converter light-off.

17. The vehicle engine control system of claim 16 wherein said controller modifies cam phasing based on integrated hydrocarbon emissions and exhaust gas energy.

18. The vehicle engine control system of claim 17 wherein said cam phasing is modified by a lookup table.

19. The vehicle engine control system of claim 16 wherein said air/fuel mixture is modified by a lookup table.

20. The vehicle engine control system of claim 16 wherein said spark angle is modified by a lookup table.

21. A method for controlling an internal combustion engine, comprising:
supplying an air/fuel mixture to cylinders of an engine that generates exhaust gas using an air-assisted direct injection fuel system;
reducing hydrocarbon emissions from said exhaust gas using a catalytic converter after said catalytic converter reaches a lift-off temperature;
deactivating at least one of said cylinders of said engine before said catalytic converter achieves said light-off temperature to hasten light-off of said catalytic converter; and
modifying said cam phasing to minimize integrated hydrocarbon emissions and to maximize exhaust gas energy.

22. The method of claim 21 further comprising modifying at least one of air/fuel mixture, and spark angle.

23. The method of claim 21 further comprising modifying said cam phasing using a lookup table that is accessed using at least one of barometric pressure, oil temperature, coolant temperature, and estimated catalytic converter temperature.

24. The method of claim 21 further comprising modifying said cam phasing using a mathematical function that is related to at least one of barometric pressure, oil temperature, coolant temperature, and estimated catalytic converter temperature.

25. The method of claim 22 wherein said controller enleans an average air/fuel mixture to reduce said hydrocarbon emissions.

26. The method of claim 25 further comprising modifying said air/fuel mixture using a lookup table that is accessed using at least one of injection air pressure, air temperature, coolant temperature, fuel pressure, rpm, and cylinder load.

27. The method of claim 25 further comprising modifying said air/fuel mixture using at least one of injection air pressure, air temperature, coolant temperature, fuel pressure, rpm, and cylinder load.

28. The method of claim 22 wherein said controller adjusts said average air/fuel mixture greater than 12:1.

29. The method of claim 22 further comprising modifying said spark angle using a lookup table that is accessed using at least one of injection air pressure, air temperature, coolant temperature, rpm, and cylinder load.

30. The method of claim 22 further comprising modifying said spark angle using at least one of injection air pressure, air temperature, coolant temperature, rpm, and cylinder load.

31. The method of claim 21 wherein said controller does not deactivate said at least one of said cylinders if an ambient temperature is below a first predetermined temperature.

32. The method of claim 21 wherein said controller waits a first predetermined period after engine startup before deactivating said at least one of said cylinders.

33. The method of claim 23 wherein said controller deactivates said at least one of said cylinders if said engine is operating at one of idle and low load.

34. The method of claim 21 wherein said controller activates all of said cylinders if said engine is operating at high load.

35. A vehicle engine control method comprising:
supplying an air/fuel mixture to cylinders of an engine that generates exhaust gas using an air-assisted direct injection fuel system;
reducing hydrocarbon emissions from said exhaust gas using a catalytic converter after said catalytic converter reaches a light-off temperature; and
modifying cam phasing of said engine, enleaning average air/fuel ratio of said engine, and retarding a spark angle of said engine to hasten catalytic converter light-off.

36. The method of claim 35 further comprising modifying said cam phasing based on integrated hydrocarbon emissions and exhaust gas energy.

37. The method of claim 36 further comprising modifying said cam phasing using at lest one of a lookup table and a mathematical function.

38. All The method of claim 35 further comprising modifying said air/fuel mixture using at least one of a lookup table and a mathematical function.

39. The method of claim 35 further comprising adjusting said cam phasing to rebreathe said hydrocarbon emissions.

40. The method of claim 35 further comprising modifying said spark angle using a lookup table.

41. A vehicle engine control system comprising:

an engine that includes a plurality of cylinders and that generates exhaust gas;

a fuel system that supplies an air/fuel mixture to said cylinders;

a catalytic converter that reduces hydrocarbon emissions from said exhaust gas after said catalytic converter reaches a light-off temperature;

a controller that communicates with said engine and said fuel system and that deactivates at least one of said cylinders of said engine before said catalytic converter achieves said light-off temperature to hasten light-off of said catalytic converter, wherein said controller optimizes engine operating parameters to hasten light-off of said catalytic converter; and wherein said controller modifies cam phasing to control hydrocarbon emissions.

* * * * *